M. WALKOS.
RESILIENT TIRE.
APPLICATION FILED AUG. 24, 1918.
1,292,667.
Patented Jan. 28, 1919.
2 SHEETS—SHEET 1.
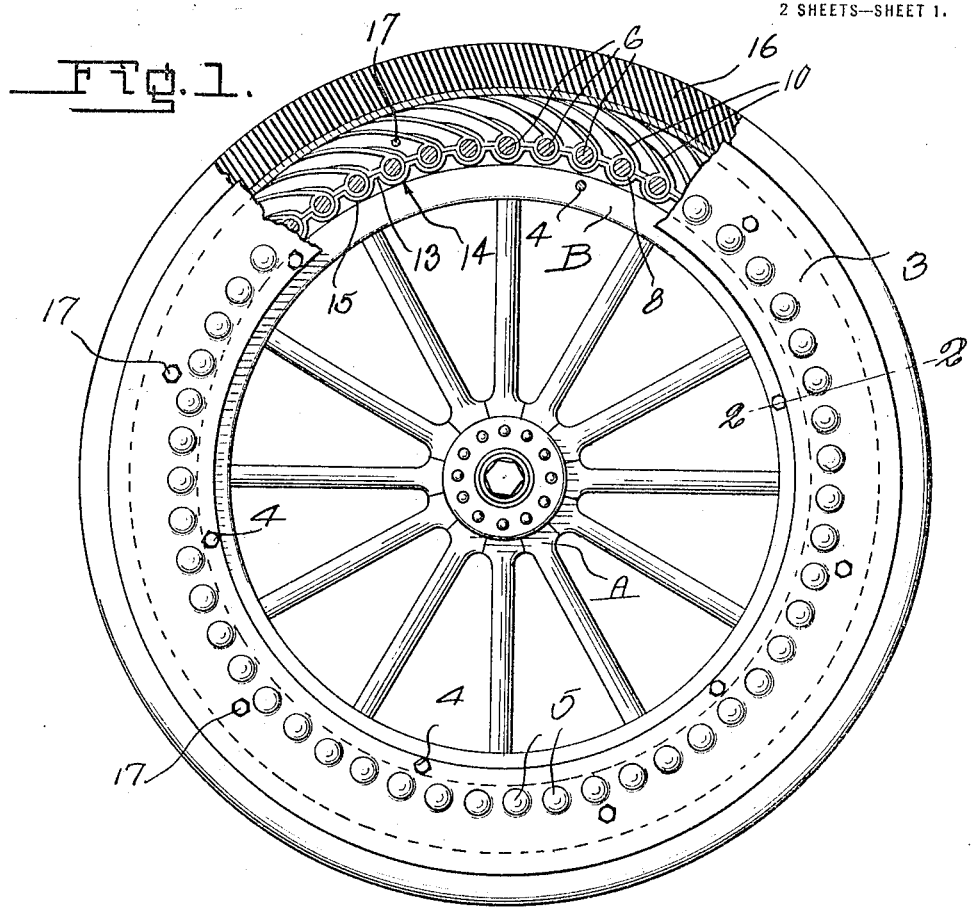
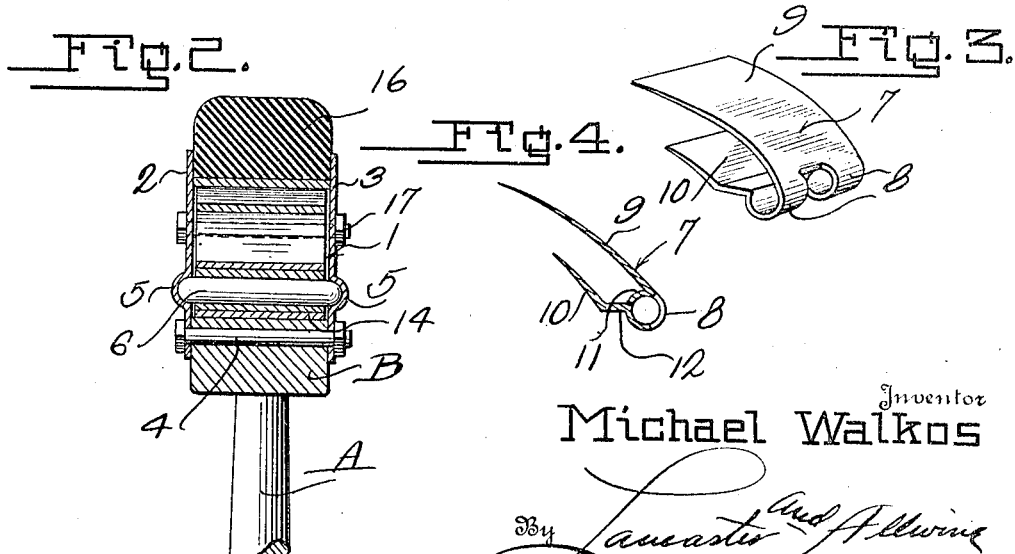
Inventor
Michael Walkos

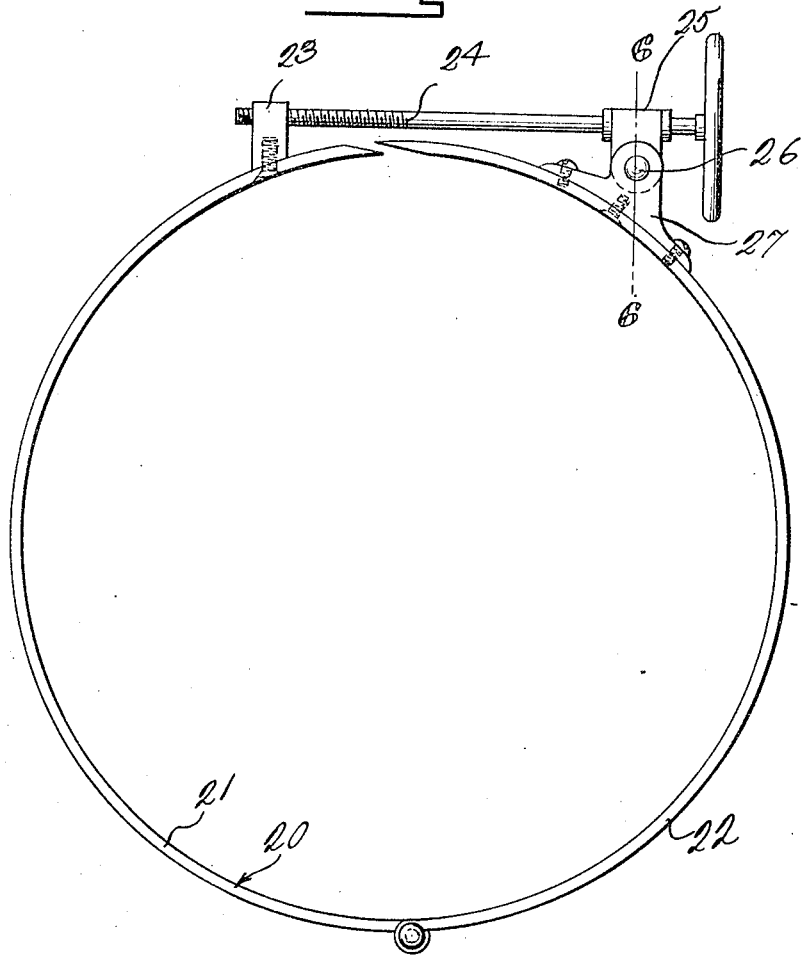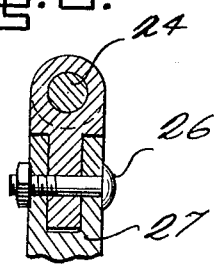

UNITED STATES PATENT OFFICE.

MICHAEL WALKOS, OF DETROIT, MICHIGAN.

RESILIENT TIRE.

1,292,667. Specification of Letters Patent. Patented Jan. 28, 1919.

Application filed August 24, 1918. Serial No. 251,290.

*To all whom it may concern:*

Be it known that I, MICHAEL WALKOS, a citizen of the United States, and a resident of Detroit, in the county of Wayne and State of Michigan, have invented certain new and useful Improvements in Resilient Tires, of which the following is a specification.

This invention relates to resilient tires, and an object of the invention is to provide a resilient tire structure adapted for use upon ordinary vehicle wheels, in lieu of pneumatic tires, as commonly used, and consequently resulting in the elimination of the many inconveniences contingent with the use of pneumatic tires, such as punctures, blow-outs, and the like.

Another object of the invention is to provide a resilient tire structure which comprises a plurality of spring or resilient members bent intermediate their ends to form a pair of substantially parallel arcuate members the innermost of which is much shorter than the outermost, and which members are cut and shaped at their bent portions to provide a bearing for a supporting pin; and also to mount a resilient tread about the circumference of the tire which tread rests upon the outer ends of the outermost length of the spring members.

Another object of the invention is to provide a device for compressing the spring members when mounting the resilient tread thereon.

Other objects of the invention will appear in the following detailed description, taken in connection with the accompanying drawings, forming a part of this specification, and in which drawings:

Figure 1 is a side elevation of a wheel showing the improved resilient tire mounted thereon and having parts of the tire structure in section.

Fig. 2 is a section on the line 2—2 of Fig. 1.

Fig. 3 is a detail perspective of one of the spring members.

Fig. 4 is a section through one of the spring members.

Fig. 5 is a side elevation of the device employed for compressing the springs to facilitate the mounting of the resilient tread about the spring members.

Fig. 6 is a detail section on the line 6—6 of Fig. 5.

Referring more particularly to the drawings, A indicates the wheel structure, which has the resilient tire structure generically indicated by the numeral 1 mounted about the rim or felly B thereof.

The resilient tire structure 1 comprises, a pair of confining plates 2 and 3 which are attached to the wheel felly B by suitable bolts 4. The plates 2 and 3 are provided with annular outstruck portions 5 which receive therein the rounded ends of pins 6. The pins 6 are provided for confining the resilient or spring members 7 in their proper places.

The resilient or spring members 7 are constructed of a sheet of spring metal which has its end portion reduced in thickness, to add to the resiliency thereof. These pieces or sheets of spring metal are rolled intermediate their ends as shown at 8 to provide the substantially parallel arcuate lengths 9 and 10. The inner length 10 is much shorter than the outer length 9, and when the plurality of spring members 7, of which the resilient tire is formed, are in proper position, the short length 10 of one of the members 7 rests against a portion of the outer surface of the long length 9 of a spring member thereto and as clearly shown in Fig. 1 of the drawings.

Each of the spring members 7 are provided with slits at the rolled portions 8, forming tongues 11 which are bowed oppositely to the rolled or bowed portions 8, coacting therewith in forming bearings for the pins 6.

The inner relatively short length 10 of the spring members 7 is provided with a substantially straight portion 12 which extends outwardly from the rolled portions of the spring plate and rests against the connecting portions 13 of the supporting strip 14. The connecting portions 13 of the strip 14 connect the upper adjacent edges of the concaved portion 15 thereof as clearly shown in Fig. 1 of the drawings. The supporting strip 14 engages about the periphery of the felly or rim B of the wheel A and it may be secured thereto in any desired manner.

A resilient tread 16 is mounted about the spring structure, and this tread may be constructed of solid rubber or suitable resilient material. A device, which is employed for facilitating the mounting of the resilient tread 16 about the spring is shown in Figs. 5 and 6. This device comprises a hoop 20, formed of hinged sections 21 and 22. The facing free ends of the sections 21 and 22 of the hoop are beveled to snugly fit one another and the section 21 has a nut 23 carried thereby in which a feed screw 24 threadably engages. The feed screw 24 is rotatably supported by a suitable bracket 25 which bracket is in turn pivotally connected as shown at 26 to a second bracket 27. The bracket 27 is attached to the section 22 of the hoop 20. The hoop 20 is placed about the outwardly extending free ends of the length 9 of the spring members, and by rotating the feed screw 24, the free ends of the hinged sections 21 and 22 may be drawn toward each other for forcing the free ends of the spring members inwardly toward the axis of the wheel and permitting the mounting of the resilient tread 16 about the spring members. After the resilient tread has been properly positioned, the hoop 20 should be removed, and the plate or plates 2 or 3 is connected to the felly B.

The shocks incident to the travel of the wheel will be administered through the resilient tread 16 to the length 9 of the spring members 7 and consequently the major portion thereof will be absorbed.

The return or outward movement of each of the lengths 9 of the spring members is retarded and to a certain extent limited by the short length 10 of the adjacent spring member, which engages the same.

Bolts 17 extend through the plates or flange members 2 or 3 intermediate the felly B and the resilient tread 16.

In assembling the resilient tire structure, one of the side plates 2 or 3 is first attached to the felly or rim B of the wheel after which the supporting strip 14 is placed about the periphery of the felly and the various pins 16 carrying the resilient springs or spring members 7 are placed in their respective positions and compressed and confined in their respective positions by means of the hoop or device 20 and confined therein by this member until the tread 16 is properly in place or is mounted about portions of the spring members after the hinged sections 21 and 22 of the hoop 20 may be spread and the latter removed from about the springs. After the hoop 20 is removed, the tread 16 may be moved to its proper position and the other of the plates 2 or 3 attached to the felly B.

It is to be understood that any suitable type of tread may be employed in the construction of the tire, such as a fabric, rope or chain tread.

Changes in details may be made without departing from the spirit of this invention, but;

I claim:

1. In a resilient tire, the combination, of a plurality of spring members each comprising substantially parallel arcuate sections of unequal lengths, the shorter of said sections resting against the outer surface of the longer section of the spring member next thereto and means for attaching said spring members to a wheel felly.

2. In a resilient tire, the combination, of a plurality of spring members each comprising substantially parallel arcuate sections of unequal lengths, the shorter of said sections resting against the outer surface of the longer section of the spring member next thereto, said spring members bowed at the conjunction of said sections and having portions cut out and bowed oppositely to the remaining portion to form bearings, pins in said bearings, and side plates, said side plates provided with outstruck portions to receive the ends of said pins.

3. In a resilient tire, the combination, of a plurality of spring members, comprising substantially parallel arcuate sections, said spring members bowed at the conjunction of said sections and having portions cut out and bowed oppositely to the remaining portions to form bearings, pins in said bearings, and side plates, said side plates provided with outstruck portions to receive the ends of said pins.

4. In a resilient tire, the combination, of a plurality of spring members, comprising substantially parallel arcuate sections, said spring members bowed at the conjunction of said sections, a supporting plate, said supporting plate provided with depressions to receive the bowed portions of said spring members, portions of said bowed portions being cut and bowed oppositely to the remaining portions to form bearings, pins in said bearings, side plates, said side plates provided with outstruck portions to receive the ends of said pins, and a tread mounted about said spring members and engaging against the outer surface of the free ends of certain of the sections of said spring member.

5. In a resilient tire, the combination, of a plurality of spring members each comprising substantially parallel arcuate sections of unequal lengths, the shorter of said sections resting against the outer surface of the longer section of the spring member next thereto, said spring members bowed at the conjunction of said sections, and a supporting plate, said supporting plate provided with depressions to receive the bowed portions of said spring members, the shorter of said spring member sections provided with substantially straight portions adapted to engage the portions of said supporting plate between the recesses therein.

6. In a resilient tire, the combination, of a plurality of spring members each comprising substantially parallel arcuate sections of unequal lengths, the shorter of said sections resting against the outer surface of the longer section of the spring member next thereto, said spring members bowed at the conjunction of said sections, a supporting plate, said supporting plate provided with depressions to receive the bowed portions of said spring members, the shorter of said spring member sections provided with substantially straight portions adapted to engage the portions of said supporting plate between the recesses therein, portions of said bowed portions being cut and bowed oppositely to the remaining portion to form bearings, pins in said bearings, and side plates, said side plates provided with outstruck portions to receive the ends of said pins.

MICHAEL WALKOS.

Copies of this patent may be obtained for five cents each, by addressing the "Commissioner of Patents Washington, D. C."